Patented May 31, 1927.

1,630,828

UNITED STATES PATENT OFFICE.

WILLIAM L. CAMPBELL, OF SPEARFISH, SOUTH DAKOTA.

COMPOSITION FOR STOPPING LEAKS.

No Drawing.     Application filed May 7, 1926.   Serial No. 107,469.

The present invention has as its object to provide a composition of matter for use in stopping leaks in automobile radiators, cracked cylinder heads, water jackets, water pipes, engine blocks, etc.

In preparing the composition, the following ingredients are mixed in substantially the stated proportions by weight:

|  | Per cent |
|---|---|
| Powdered ginger | 50 |
| Lime | 23 |
| Sulphur | 20 |
| Gum arabic | 7 |

The ingredients are all in powdered form and are thoroughly mixed until the mixture is uniform throughout, whereupon the composition is ready for use.

In using the composition and for example, in stopping ordinary small leaks in automobile radiators, two or three tablespoonsful of the composition is introduced into the radiator for each two gallons of water and the motor is run to effect circulation of the composition, whereupon it will seek the leaks and become deposited in the openings or cracks, thus stopping the leaks.

Where the composition is to be employed in closing relatively large cracks, as for example in cylinder heads, etc., a sufficient quantity of water is added to a quantity of the composition to form a doughy or pasty mixture and is applied in a manner to close the openings or cracks, and preferably the water cooling system is supplied with a quantity of the mixture, at the same time, in order to seal the cracks or openings at the interior of the cylinder head. The pasty mixture is preferably applied while the cylinder head or other structure to be repaired is warm or hot so that the moisture in the mixture will be quickly evaporated after application of the mixture to the said cylinder head or the like.

Owing to the affinity of ginger for various metals I have found that this ingredient is essential in my composition for effective results, and it may be added that any grade may be used. However, when my composition is used in large quantities I prefer to use a comparatively cheap grade of commercial ginger.

Having thus described the invention, what I claim is:

A composition adapted to be used for sealing leaks in automobile radiators or the like comprising a mixture of ginger, lime, sulphur, and gum arabic in substantially the proportions described.

In testimony whereof I affix my signature.

WILLIAM L. CAMPBELL. [L. S.]